US006325277B1

(12) United States Patent
Collie (10) Patent No.: US 6,325,277 B1
(45) Date of Patent: Dec. 4, 2001

(54) APPARATUS AND METHOD FOR ALIGNING TUBING SEGMENTS

(75) Inventor: Gary Collie, 49 W. 233 Hinkley Rd., Big Rock, IL (US) 60511

(73) Assignee: Gary Collie, Big Rock, IL (US)

( * ) Notice: Subject to any disclaimer, the term of this patent is extended or adjusted under 35 U.S.C. 154(b) by 0 days.

(21) Appl. No.: 09/394,150

(22) Filed: Sep. 13, 1999

(51) Int. Cl.[7] .............................. B25B 1/20; B23K 1/00; B23K 37/00
(52) U.S. Cl. ........................ 228/212; 228/29; 228/44.3; 269/43
(58) Field of Search ................... 228/212, 44.3, 228/29; 269/43

(56) References Cited

U.S. PATENT DOCUMENTS

| 274,868 | | 3/1883 | Watkins . | |
|---|---|---|---|---|
| 2,741,206 | | 4/1956 | Stevenson . | |
| 3,400,872 | | 9/1968 | Rogers . | |
| 3,422,519 | | 1/1969 | Fehlman . | |
| 3,653,115 | * | 4/1972 | Perkins | 29/237 |
| 3,705,453 | * | 12/1972 | Olson | 29/200 P |
| 3,761,005 | * | 9/1973 | Baxter et al. | 228/4 |
| 3,823,862 | * | 7/1974 | Reedy et al. | 228/4 |
| 4,016,637 | | 4/1977 | Swenson . | |
| 4,153,194 | * | 5/1979 | Leonard, Jr. | 228/29 |
| 4,356,615 | * | 11/1982 | Dearman | 29/525 |
| 4,804,813 | * | 2/1989 | Tesch | 219/60 A |
| 4,868,367 | * | 9/1989 | Benway et al. | 219/161 |
| 5,052,608 | * | 10/1991 | McClure | 228/44.5 |
| 5,104,102 | * | 4/1992 | Buxton | 269/43 |
| 5,165,160 | * | 11/1992 | Poncelet | 29/464 |
| 5,415,435 | * | 5/1995 | Colbert | 285/23 |
| 5,738,386 | * | 4/1998 | Barefoot et al. | 285/284.1 |
| 5,843,271 | * | 12/1998 | Andrew et al. | 156/499 |
| 5,865,430 | * | 2/1999 | Conover et al. | 269/43 |
| 5,868,441 | * | 2/1999 | Gill | 285/322 |
| 5,873,611 | | 2/1999 | Munley et al. | 285/367 |

FOREIGN PATENT DOCUMENTS

| 0256525 | * | 2/1988 | (EP) | 228/212 |
|---|---|---|---|---|
| 2189177A | * | 10/1987 | (GB) | 228/212 |

* cited by examiner

Primary Examiner—M. Alexandra Elve
Assistant Examiner—L. Edmondson
(74) Attorney, Agent, or Firm—Cook, Alex, McFarron, Manzo, Mannings & Mehl Ltd.

(57) ABSTRACT

An apparatus and method for precisely aligning and holding two thin walled stainless steel sanitary tubing segments end-to-end to allow for tack welding of the segments together during a tube assembly process are disclosed. The apparatus includes two pivotally connected C-shaped clamp halves that contact almost an entire circumferential path along the outer walls of both aligned tubing segments. The apparatus is not designed to reshape the ends of the tubing segments, but rather is designed for precision alignment of the ends of the tubing segments during the tack welding process. The process includes use of an apparatus constructed in accordance with the principles of the invention.

3 Claims, 4 Drawing Sheets

APPARATUS AND METHOD FOR ALIGNING TUBING SEGMENTS

BACKGROUND OF THE INVENTION

The present invention is generally directed to an apparatus and method for aligning tubing, and more particularly to an apparatus and method for precisely aligning and holding two thin walled stainless steel sanitary tubing segments end-to-end to allow for tack welding of the segments together during a tube assembly process.

It is generally known that thin walled stainless steel tubing is used in a variety of industrial applications. For instance, such tubing is commonly included in the devices used to carry out food and pharmaceutical manufacturing processes. Once a variety of tubing segments are manufactured, segments are typically welded together to form a desired spool of tubing. During this welding process, a joint is formed at each seam positioned between any of the two adjacent tubing segments.

The Food and Drug Administration (FDA) has regulated this welding process of stainless steel sanitary tubing and all joints must pass an inspection under stringent standards. The segments of thin walled stainless steel tubing are ordinarily welded together by a process known as fusion welding. During fusion welding, layers of additional metal (i.e., filler metal) are not added to the joint formed between two abutting tubing segments, as is the case with traditional welding. Rather, during fusion welding, no metal is added and the ends of the tubing segments are fused together to create the welded joint.

Under current FDA standards, an inert gas purge (ordinarily known in the art as a "pure" inert gas purge, must be maintained within the interior (i.e., within the inner wall) of the tubing segments during the entire welding process. This use of an inert gas purge prevents the discoloration and oxidation of the tubing during the tack welding process As used herein, the phrase entire welding process includes both a tack welding process and an orbital welding process, both of which are described below. In those cases wherein the desired spool includes more than two tubing segments so that more than one welded joint is formed, then the entire welding process consists of a tack welding process and an orbital welding process for each welded joint.

Once the entire welding process has been completed, the formed spool, consisting of all the adjacent tubing segments fusion welded together, is ready for installation in the process system. As used herein, the phrase tubing segment shall include not only straight cylindrical tubing, but also any fittings, such as elbows and tees also included within the formed spool. Fittings might be required, for instance, where the desired spool includes a bend at a designated angle. As herein used, a spool is a portion of a process system consisting of a plurality of tubing segments welded together.

During the welding process, the tubing segments are first held in place and tack welded together. Typically, the tack welds formed are no larger than the head of a pin. Their purpose is to hold the tubing segments in alignment during the orbital welding process.

Until now, while performing this tack welding process, a person would typically hold the ends of the tubing segments in alignment while another person tack welded them using a tungsten electrode. The tungsten electrode used typically has an inert gas cap or shield to prevent or at least minimize the exposure of oxygen to the seam between the tubing segment ends. Thus, the tubing segments are held together in a true manual fashion during the tack welding process.

After formation of the tack welds, an orbital welder is used to complete the welding process. During orbital welding, a tungsten electrode traverses about the perimeter of the seam between the tubing segments.

As will be appreciated, until now, this welding process was costly and often ineffective. For instance, those skilled in the art will appreciate the precision with which the ends of the tubing segments must be welded in order to pass FDA inspection. Employing a person to hold the tubing segments in place while tack welding the same rendered it difficult to achieve the necessary precise alignment of the tubing segments. To pass inspection under the FDA standards, several attempts to construct a desired spool were often required, particularly where the desired spool necessitated the formation of a plurality of joints along its length.

Even in those cases where all of the joints formed were able to pass inspection, this practice required the employment of an additional person. As will be appreciated, this increased the costs associated with the welding process.

Furthermore, during tack welding, each joint required its own independent inert gas purge. As will be appreciated, this significantly increased the time necessary to perform the welding process because of the time spent waiting for each purge to be completed. Also, this again increased the costs associated with the welding process. For this reason, costs escalated because of the additional usage of the inert gas, which is relatively expensive.

With the present invention, the previous requirement of using an additional person during the welding process has been eliminated to reduce costs associated therewith. The tubing segments can now be joined together easily in position or on a bench or the like. Additionally, the ends of the tubing segments are now held firmly together in precision alignment to reduce the likelihood of inspection failure and thereby also reduce costs associated with the welding process. Furthermore, in those instances where the desired spool necessitates the formation of a plurality of joints along its length, the present invention permits the adjacent tubing segments to be held firmly in place at each seam during the tack welding process. In other words, the apparatus permits a welder to assemble and tack weld multiple joints on fabricated tubing segments prior to final orbital welding. As a result, only a single inert gas purge is required for both the tack welding and orbital welding processes. Time and money are thereby saved.

The apparatus of the present invention is directed to a unique clamp or jig that permits tubing segments to be held firmly in place while they are tack welded together at their seam. The method of the present invention is directed to employment of an apparatus of this type during the tack welding process of this entire welding process.

Although clamps of many types are generally known, the prior art clamps are not specially designed for precision alignment of two thin walled stainless steel tubing segments while they are tack welded together. In particular, several of the prior art clamps do not come into contact with both tubing segments in a way so that they contact almost an entire circumferential path along the respective outer walls of the adjacent tubing segments. Such contact is required to achieve the requisite precision alignment of the tubing segments in order to increase the likelihood of carrying out the fusion welding process in compliance with FDA standards. One prior art patent disclosing a clamp that would not provide such contact is U.S. Pat. No. 3,400,872, issued to Rogers. In that patent, the disclosed clamp includes four set screws that hold two pipe segments in place, and therefore the clamp does not provide for the precision alignment achieved by the present invention.

Additionally, several of the prior art clamps are designed for pipe, not tubing, and are directed not only to achieving and maintaining alignment between two pipe segments, but also towards reforming the shape of the ends of the adjacent pipe segments when either or both of those segments are out-of-round. Accordingly, these prior art clamps are relatively large and heavy. It will be appreciated that the tubing manufactured for the present process systems is manufactured to more rigid standards than the pipes used in piping systems. Moreover, several of the prior art clamps cannot be clamped in a relatively easy fashion.

An example of a clamp that is useful for certain, limited purposes, but is not useful for present purposes is disclosed in U.S. Pat. No. 5,738,386, issued to Barefoot et al. The clamp disclosed therein has two opposing C-shaped members that include flange-like portions at the extremities thereof. To fasten the clamp to the pipe ends, the C-shaped members are placed on opposite sides of the seam formed at the pipe ends. Next, the flange-like portions are brought into registration with the associated flange-like portions of the other C-shaped member, and a nut and bolt are fastened through each of the bores extending through the flange-like portions formed on diametrically opposed parts of the clamp. In addition to the apparent difficulties inherent in trying to fasten the clamp to the pipe ends, this clamp is designed to reshape the ends of the pipe segments. Those skilled in the art will appreciate that this further increases the likelihood that the instant welding process cannot be conducted and completed in compliance with the FDA standards.

The apparatus of the present invention includes two pivotally attached clamp halves that permit easy fastening to the ends of two adjacent tubing segments, and is not designed to reshape the ends of the tubing segments. Rather, it is designed for precision alignment of the ends of the tubing segments so that they can be tack welded together.

SUMMARY OF THE INVENTION

The present invention is directed, in parts to an apparatus for aligning tubing segments precisely. This apparatus is in contact with almost an entire circumferential path along the outer walls of both aligned tubing segments.

In its preferred form, the apparatus includes two pivotally connected generally C-shaped clamp halves or parts. Two oppositely mounted brackets provide means for pivotally connecting the C-shaped clamp parts. The clamp parts are pivotally connected so that they can be easily closed about the aligned ends of two adjacent tubing segments to hold same in place while tack welds are made at the seam formed between them. Each of the clamp parts includes a circumferentially and axially extending cutout formed in a central portion thereof to allow tack welding of the aligned tubing segment ends.

Each C-shaped clamp part includes two C-shaped portions axially separated by the central portion. Both C-shaped portions associated with a particular one of the clamp parts together define approximately one half of the outer surface of the apparatus and approximately one half of the inner surface of the apparatus. Each C-shaped portion includes a circumferentially and radially extending outside face, an axially and circumferentially extending rim, and an axially, circumferentially and radially extending beveled ramp surface. Together, the rim and ramp surface for each C-shaped portion form substantially the entire axial thickness of that portion.

Each C-shaped portion also includes an inner surface that is in registration with the inner surface of its associated C-shaped portion. The inner surfaces are designed to receive and contact an entire circumferential surface along the outer walls of each of the aligned tubing segments. The two associated C-shaped portions for each C-shaped clamp part are connected by axially and circumferentially projecting bridge portions that are formed at the outer extremities of the central portion between the associated C-shaped portions. These bridge portions have a hollow space between them that defines an access port adapted to accommodate the tip of a tungsten electrode while tack welds are made to maintain the two aligned tubing segment ends in position prior to orbital welding.

For one of the C-shaped clamp parts, a rod also connects its two associated C-shaped portions. This rod is press-fitted into each of the C-shaped portions through their respective ramp surfaces. The rod carries a threaded shaft having a bore extending through it. The threaded shaft is pivotally and slidably mounted on the rod, and an elongated, cylindrical, closed-ended nut having a threaded inner surface is threaded thereon. The nut has a bore extending through it. An elongated pin extends through the bore of the nut and is slidably positioned therein. The elongated pin has a central portion with a small enough cross-section so that the pin can slide while positioned in the bore, and end portions positioned at opposite ends of the pin. Each of the pin end portions has a large enough cross-section so that the pin cannot slide out of the bore.

In the other of the C-shaped clamp parts, in addition to its bridge portions, a bracket also connects its two associated C-shaped portions. Each of those two C-shaped portions includes a wall that enables the bracket to be mounted thereto. Fasteners are included and are inserted through bores extending through the bracket. Each fastener further extends into the C-shaped portion associated therewith to mount the bracket to that portion. The bracket includes a channel defined by its configuration. The channel is large enough to receive and accommodate the threaded shaft and allow same to be seated therein, but small enough so that it cannot receive and accommodate the elongated nut.

In another of its aspects, the present invention is directed to a method of tack welding together two or more aligned tubing segments by utilizing the disclosed apparatus or a similar device constructed in accordance with the principles of the present invention. The method is preferably also directed to orbital welding the two or more tubing segments together. This orbital welding of the tubing segments is preferably performed upon completion of the tack welding process, and preferably after the clamp is removed from the segments. Advantageously, utilizing an apparatus constructed in accordance with the principles of the present invention while performing the tack welding process yields several benefits. For instance, a single welder can perform the entire process and can do so with only a single inert gas purge.

BRIEF DESCRIPTION OF THE DRAWINGS

In describing the preferred embodiments of the present invention, reference is made to the accompanying drawings wherein like reference numerals refer to like parts, and wherein.

DETAILED DESCRIPTION OF THE PREFERRED EMBODIMENTS

Referring to the Figures generally, and to FIGS. 1–5 specifically, an apparatus generally designated 10 for aligning tubing segments is shown. Apparatus 10 is designed to align stainless steel thin walled sanitary tubing segments 12, 14 in a precise manner, and in its preferred form, aligns their ends to within 0.003 of an inch. Apparatus 10 accomplishes this precision alignment of the tubing segment ends by retaining tubing segment 12 so that the inner surface of the apparatus is in contact with almost an entire circumferential path along the outer wall 16 of that tubing segment. The inner surface of apparatus 10 is similarly in retaining contact with almost an entire circumferential path along the outer wall 18 of tubing segment 14.

Figures 4, 5:
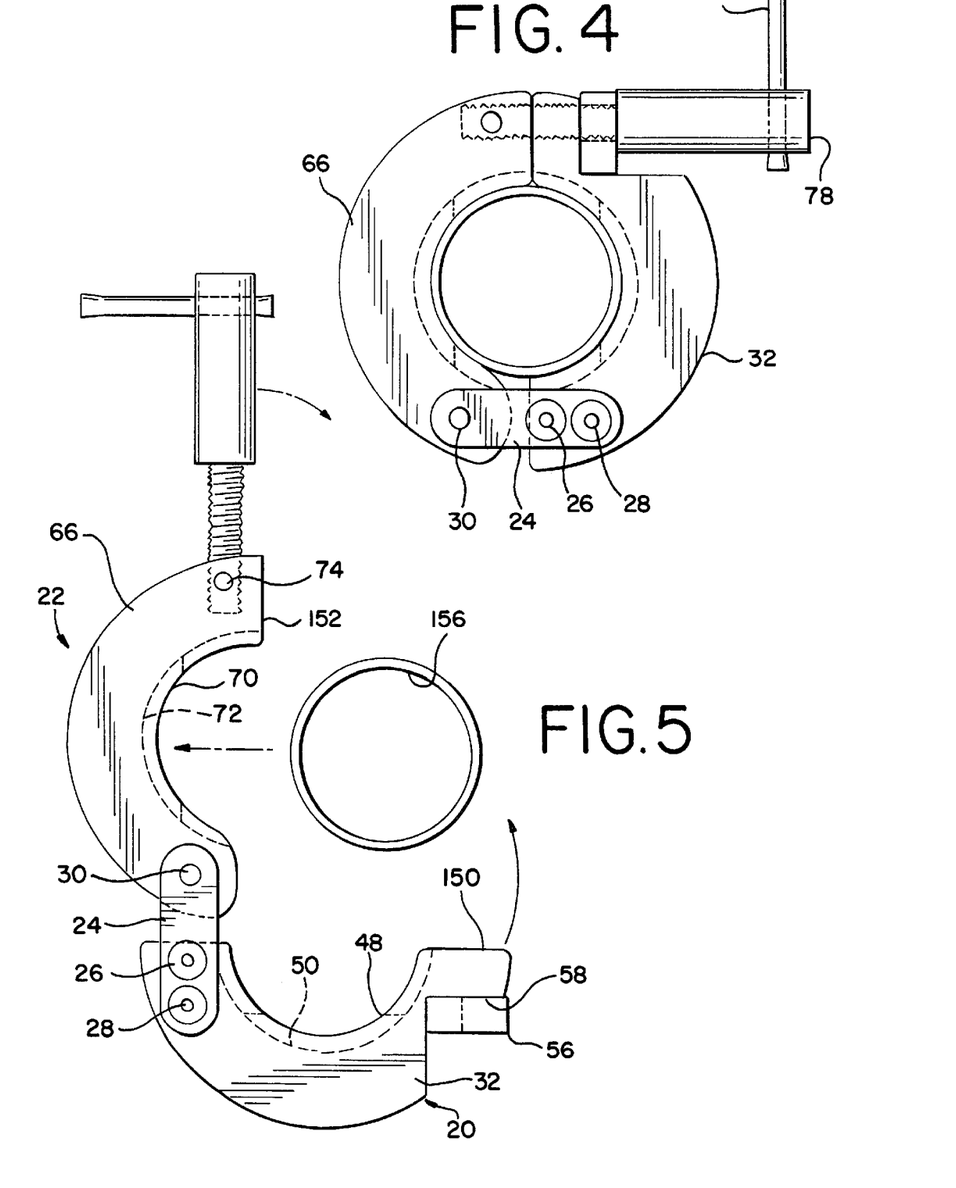
FIG. 4 is an end view of the apparatus shown in FIG. 1, shown again in its closed, locked orientation about the ends of two aligned tubing segments.
FIG. 5 is another end view of the apparatus shown in FIG. 1, shown in its open, unlocked orientation.

As shown, apparatus 10 includes two pivotally connected generally C-shaped clamp halves or parts designated by reference numerals 20 and 22, and best shown in FIG. 5. C-shaped clamp part 20 and C-shaped clamp part 22 each constitute approximately one half of the outer surface of apparatus 10 and approximately one half of the inner surface of apparatus 10. Two oppositely mounted brackets 24 provide means for pivotally connecting C-shaped clamp part 20 with C-shaped clamp part 22. In their preferred form, mounting brackets 24 are fixedly mounted to clamp part 20 via fasteners 26, 28, and are pivotally mounted to clamp part 22 via pin 30.

Figures 1, 2, 3:
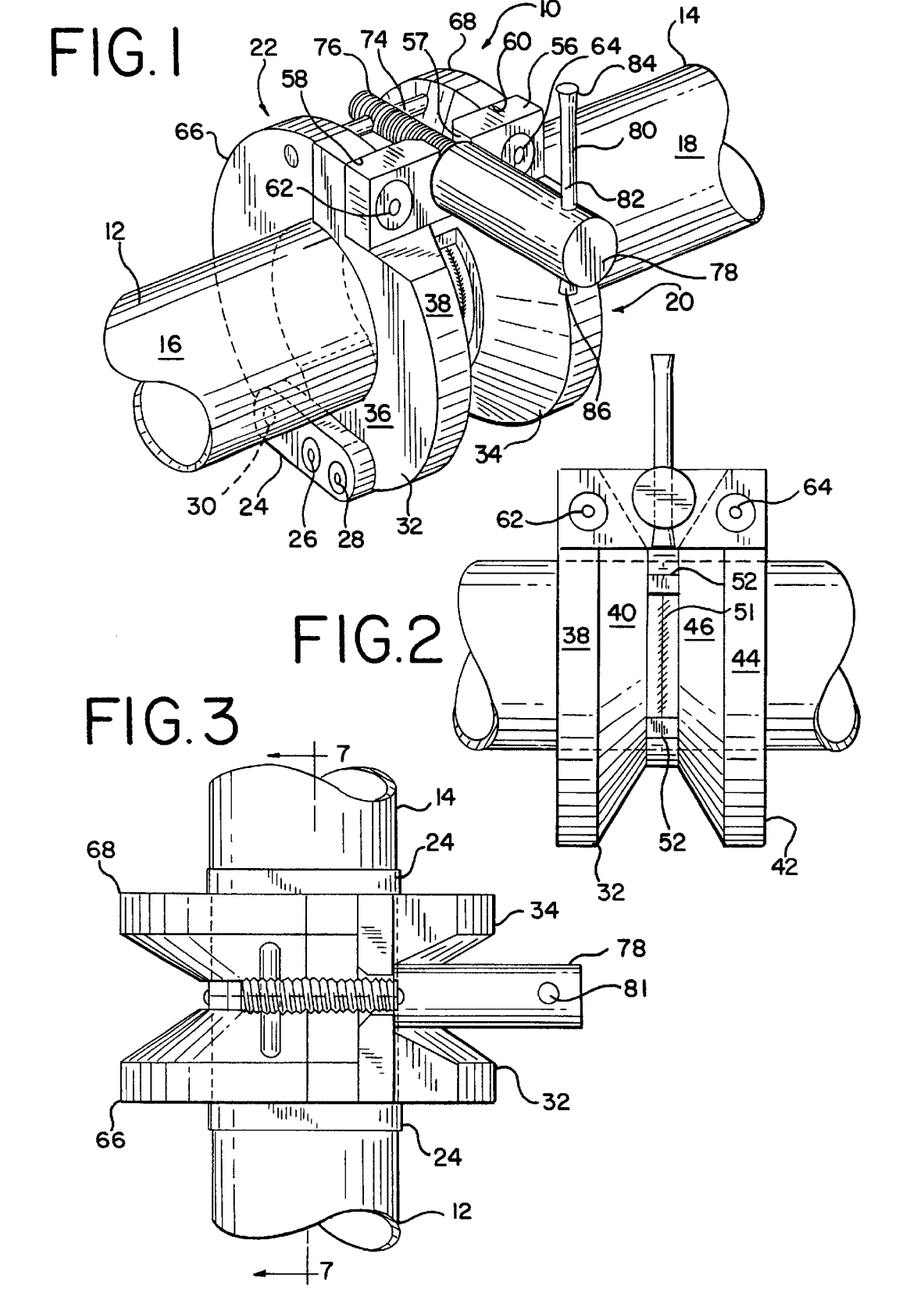
FIG. 1 is a perspective view showing the apparatus of the present invention in its closed, locked orientation about the ends of two aligned tubing segments.
FIG. 2 is a front elevational view of the apparatus shown in FIG. 1, shown again in its closed, locked orientation about the ends of two aligned tubing segments.
FIG. 3 is a top plan view of the apparatus shown in FIG. 1, shown again in its closed, locked orientation about the ends of two aligned tubing segments.

C-shaped clamp part 20 includes two similarly constructed, C-shaped portions 32, 34 axially separated by an integral central section of the clamp half. C-shaped portion 32 includes a circumferentially and radially extending outside face 36, an axially and circumferentially extending rim 38, and an axially, circumferentially and radially extending beveled ramp surface 40. As best shown in FIG. 2, together, rim 38 and ramp surface 40 form substantially the entire axial thickness of C-shaped portion 32. C-shaped portion 34 includes similarly extending surfaces—namely an outside face 42, a rim 44, and a ramp surface 46. Again, as best shown in FIG. 2, rim 44 and ramp surface 46 form substantially the entire axial thickness of C-shaped portion 34.

Referring to FIG. 5, C-shaped portion 32 has an inner surface 48, which forms a portion of the inner surface of apparatus 10. Similarly, C-shaped portion 34 has an inner surface 50 (shown by a dashed line in FIG. 5), which also forms a portion of the inner surface of apparatus 10. Inner surface 48 of C-shaped portion 32 and inner surface 50 of C-shaped portion 34 are in registration and are circumferentially aligned with each other. As shown in FIG. 1, inner surface 48 accommodates and holds the outer wall 16 of tubing segment 12 while inner surface 50 accommodates and holds the outer wall 18 of tubing segment 14. As further shown, in this manner, the tubing segment ends are held together by C-shaped portion 32 and C-shaped portion 34 on opposite sides of, but in close proximity to, the seam 51 (see FIG. 7) formed at the juncture of the segment ends.

Referring back to FIG. 5, as shown, C-shaped portion 32 has an end wall 150, and it will be appreciated that C-shaped portion 34 has a similar end wall.

Referring again to the Figures generally, C-shaped portion 32 and C-shaped portion 34 of C-shaped clamp part 20 are connected by two axially and circumferentially projecting bridge portions 52 (see FIG. 2) that are formed at the extremities of the integral central section positioned between the associated C-shaped portions. Bridge portions 52 have a hollow space between them that defines an access port 54 for C-shaped clamp part 20. Access port 54 is sized to accommodate the tip of a tungsten electrode while tack welds are made at the seam 51 between the two aligned tubing segment ends.

C-shaped portion 32 and C-shaped portion 34 are further connected by a bracket 56. In particular, C-shaped portion 32 includes a wall 58 that enables one end of bracket 56 to be mounted thereto. Similarly, C-shaped portion 34 includes a wall 60 that enables the other end of bracket 56 to be mounted thereto. Apparatus 10 includes fasteners 62, 64, which are inserted into and through bores extending through bracket 56. Fasteners 62, 64 are fastened to walls 58, 60 of C-shaped portions 32, 34, respectively, to mount opposite ends of bracket 56 thereto. Bracket 56 includes a channel 57 defined by its configuration. Channel 57 is large enough to form a seat for and to receive and accommodate the threaded shaft 76 of a locking device for the apparatus, but small enough so that it cannot receive and accommodate the elongated nut 78 threaded on shaft 76.

Like C-shaped clamp part 20, C-shaped clamp part 22 includes two C-shaped portions 66, 68 axially separated by an integral central section of clamp half 22. Both C-shaped portions 66, 68 include a circumferentially and radially extending outside face, an axially and circumferentially extending rim, and an axially, radially and circumferentially extending beveled ramp surface, just like the C-shaped portions 32, 34 for clamp part 20 described above.

Referring to FIG. 5, C-shaped portion 66 has an inner surface 70, which forms a portion of the inner surface of apparatus 10. Similarly, C-shaped portion 68 has an inner surface 72 (shown by a dashed line in FIG. 5), which also forms a portion of the inner surface of apparatus 10. Inner surface 70 of C-shaped portion 66 and inner surface 72 of C-shaped portion 68 are in registration and are circumferentially aligned with each other. As shown in FIG. 1, inner surface 70 accommodates and holds the outer wall 16 of tubing segment 12 while inner surface 72 accommodates and holds the outer wall 18 of tubing segment 14. As further shown, in this manner, the tubing segment ends are held together by C-shaped portion 66 and C-shaped portion 68 on opposite sides of, but in close proximity to, seam 51 (see FIG. 7) formed at the juncture of the segment ends.

Like C-shaped portions 32, 34, C-shaped portions 66, 68 are also connected by two axially and circuniferentially extending bridge portions that are formed at opposite extremities of the central section positioned between the associated C-shaped portions. Again, the bridge portions have a hollow space between them that defines an access port for C-shaped clamp part 22. This access port is sized to accommodate the tip of a tungsten electrode while tact welds are made at the seam 51 (see FIG. 7) formed between the two aligned tubing segment ends.

C-shaped portion 66 and C-shaped portion 68 are further connected by a rod 74. Rod 74 is press-fitted into C-shaped portions 66, 68 through their respective ramp surfaces. Rod 74 carries a threaded shaft 76, which has a bore extending through it. Threaded shaft 76 is pivotally and slidably mounted on rod 74, and an elongated, cylindrical, closed-ended nut 78 having a threaded inner surface is threaded thereon. Nut 78 has a bore extending through it. An elongated pin 80 extends through the bore of nut 78 and is slidably positioned therein. Pin 80 has a central portion 82 and end portions 84, 86. Central portion 82 preferably has a small enough cross-section so that pin 80 is slidable within the bore of nut 78, and end portions 84, 86 have large enough cross-sections so that pin 80 cannot slide entirely out of the bore.

Figure 7:
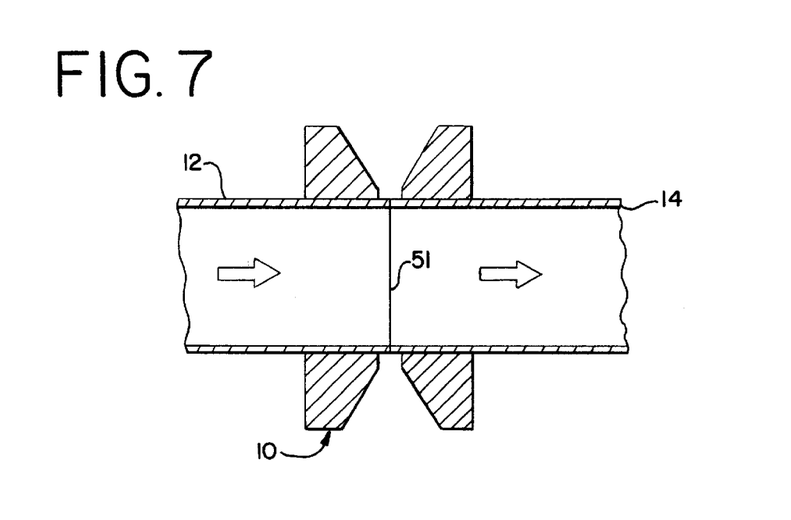
FIG. 7 is a sectional view taken along line 7—7 of FIG. 3, showing the inert gas purge that takes place during the spool assembly process.
Figure 8:
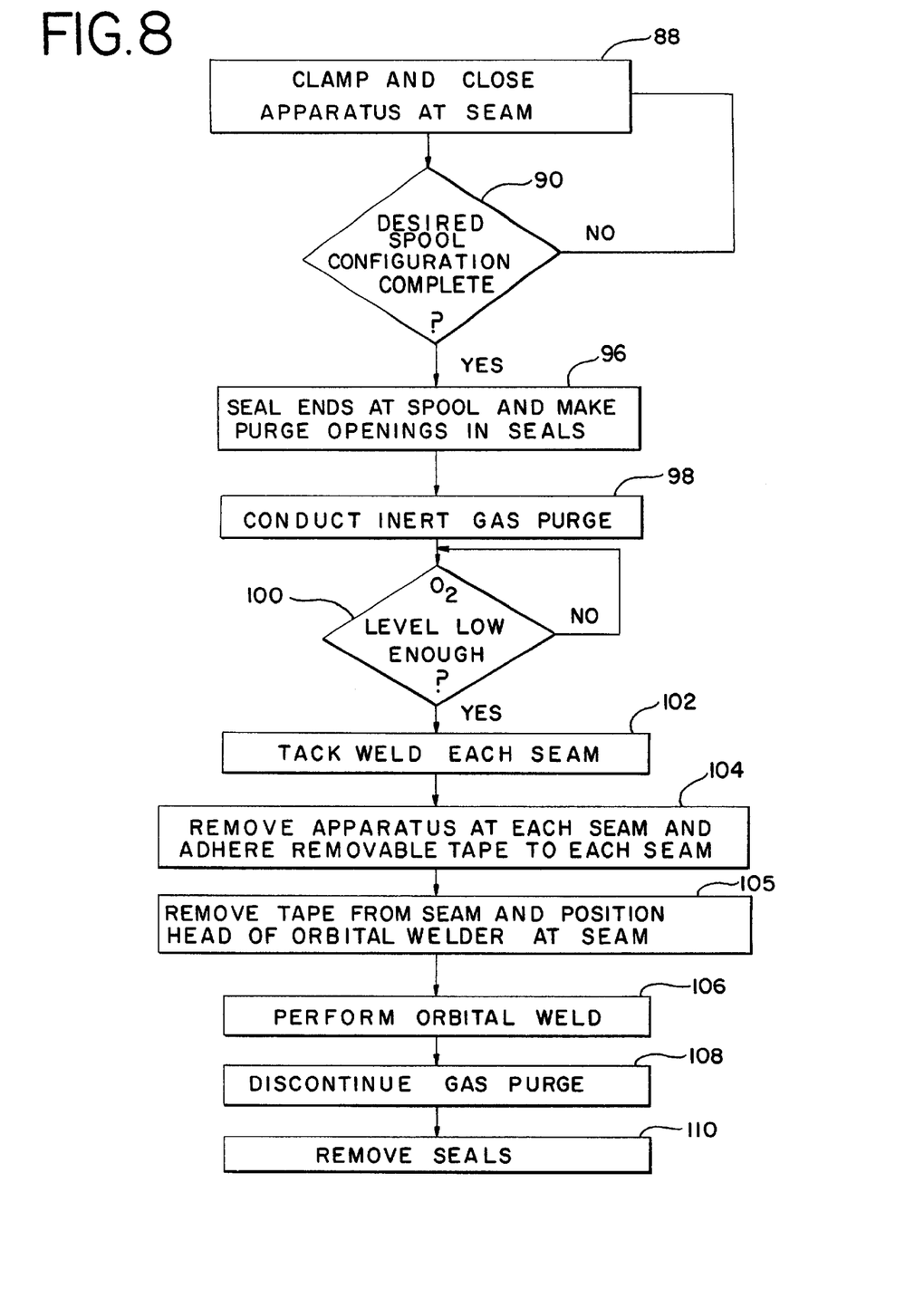
FIG. 8 is a flow chart diagram setting forth the method of performing the entire welding process of the present invention.

In operation, and as illustrated in FIG. 8 as step 88, apparatus 10 or a similar device is closed over the seam 51 (see FIG. 7) formed at the ends of two adjacent tubing segments and locked in place. In the preferred manner of carrying out this process, two tubing segments, such as tubing segments 12 and 14 shown in FIG. 1, are brought together in an end-to-end relationship. While in its open orientation (see FIG. 5), apparatus 10 is then positioned for placement over the aligned ends of the tubing segments 12 and 14 (see FIG. 1). As shown, clamp parts 20, 22 are pivotally connected so that they can be easily placed over and closed about the aligned ends of tubing segments 12, 14.

Tubing segment 12 is brought into contact with the inner surface 70 of C-shaped portion 66. Likewise, tubing segment 14 is brought into contact with the inner surface 72 of C-shaped portion 68. The respective ends of tubing segments 12, 14 are then brought together to form a seam 51 (see FIG. 7) between them. Seam 51 is positioned so that it lies between C-shaped portions 66, 68 along the central section of clamp part 22 and is visible through the access port separating those portions.

Thereafter, apparatus 10 is moved into its closed, unlocked orientation and is clamped about tubing segments 12, 14. In particular, clamp part 20 is rotated towards clamp part 22 (in a counterclockwise direction as shown in FIG. 5) until its end surfaces 150 abut the end surfaces 152 of clamp part 22. As will be appreciated, clamp part 20 and mounting brackets 24 pivot about pin 30 during this rotational movement.

Finally, apparatus 10 is placed into its closed, locked orientation. In particular, threaded shaft 76 is rotated about rod 74 (in a clockwise direction as shown in FIG. 5) and seated within the channel 57 built into bracket 56. Elongated nut 78 is then tightened by rotating it with pin 80 until the nut abuts against bracket 56 and then is further tightened until apparatus 10 is held firmly in place in its closed, locked orientation. In this position end surface 150 is in tight contact with end surface 152.

While apparatus 10 is so positioned and is further in its closed, locked orientation, it holds tubing segments 12, 14 in place so that tack welds can be made at their seam 51. The tack welds are preferably made with a tungsten electrode by utilizing the fusion welding process, described above. As will be appreciated, the access ports 54 are large enough to accommodate the tip of the tungsten electrode to permit this fusion tack welding of tubing segments 12, 14. The tungsten electrode preferably has a cap or shield that permits a flow of inert gas to shield the tack weld from oxygen.

In its closed, locked orientation, the inner surface of apparatus 10 provides retained contact with almost an entire circumferential path about the outer walls 16, 18 of tubing segments 12, 14. Importantly, apparatus 10 is not designed to reform the shape of the ends of tubing segments 12, 14. Rather, apparatus 10 is a lightweight, yet durable, clamp or jig that achieves and maintains the precision alignment of tubing segment 12 with tubing segment 14 during this tack welding process.

Figure 6:
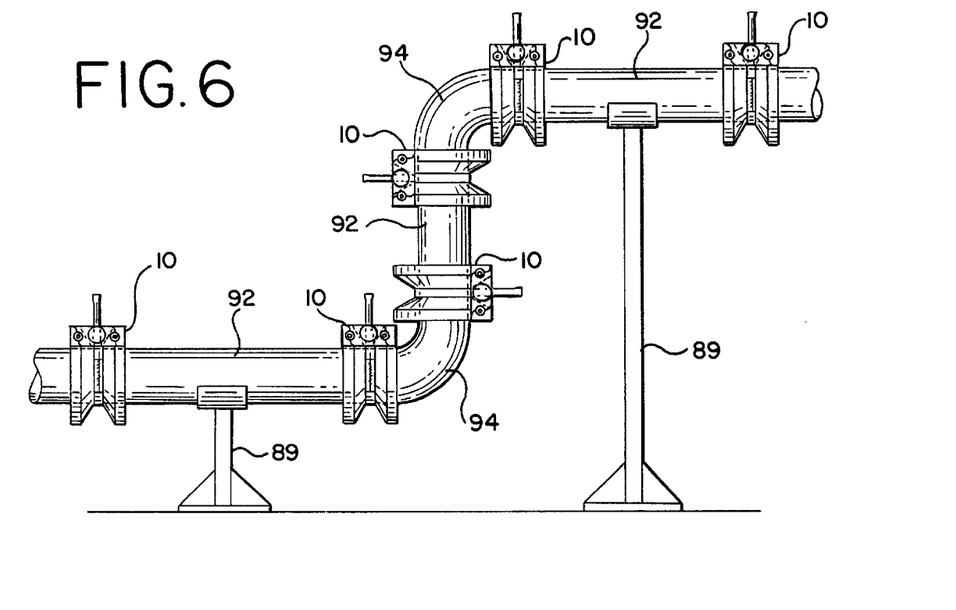
FIG. 6 is a front elevational view of a plurality of aligned tubing segments held firmly in place at every seam formed between the ends thereof by a plurality of apparatuses of the type shown in FIG. 1.

Referring now to FIGS. 6–8, aspects of the entire welding process of the present invention are illustrated. In FIG. 8, step 88 generally illustrates the above-described step of closing apparatus 10 or a similar device over the seam of two adjacent tubing segments and locking the apparatus in place. The preferred manner of carrying out step 88 is described above. After step 88 has been carried out, a decision is then made, represented by block/step 90, as to whether the desired spool configuration has been assembled. In addition to adding more tubing segments, adjustments are easily made by slightly loosening nut 78, adjusting a particular tubing segment, and thereafter tightening the nut.

As shown, step 88 is successively repeated for each seam between any two adjacent tubing segments until it has been determined that the desired spool configuration has been assembled. Referring to FIG. 6, the ends of straight tubing segments 92 are aligned with the ends of angular, or elbow, tubing segments 94 to form a desired spool configuration. An apparatus 10 is closed and locked about each seam formed at each place where the ends of any two tubing segments 92, 94 meet. During the assembly process, the tube to be welded is placed on stands 89. The welding process is then completed.

After the desired spool configuration has been assembled, the response to the inquiry in block 90 is affirmative. Therefore, step 96 is carried out and the open ends of the assembled spool are first sealed, and then purge openings are made in the seals. This step can be conducted in any manner well known in the art. As will be appreciated, the seals formed at the ends of the spool could have purge openings already in place. In that case, the latter sub-step of making purge openings in those seals would be pointless.

Upon completion of sealing step 96, an inert gas purge is initiated and maintained within the interior (i.e., within the inner wall 156 (see FIG. 5)) of the assembled spool, as represented by step 98, This inert gas purge is shown in arrow form in FIG. 7. Those skilled in the art will appreciate that any suitable inert gas can be used; however, Argon gas is preferred. Next as represented by step 100, the oxygen level within the inner wall of the assembled spool is monitored to determine whether it is at a suitably low enough level to begin the tack welding process.

Once the oxygen level is sufficiently low, tack welds are made at each of the seams 51 between the ends of all adjacent tubing segments 92, 94. This tack welding is represented by step 102 in FIG. 8, and it will be appreciated that the tack welds are made by fusion welding the ends of the adjacent tubing segments together at the seams formed thereby. As will be appreciated, it is most efficient to tack weld each seam in succession from one end of the tube towards the other.

After tack welding of each seam, apparatus 10 or any similar device used is then removed from each seam and replaced by removable tape to retain the purge gas, as represented by step 104. Again, it is most efficient to remove each apparatus 10 and apply tape at each seam in succession from one end of the tube towards the other. As will be understood, this purge of inert gas is maintained while this step is performed.

Next, at step 105, the removable tape is removed from the first seam, and then an orbital welder head is positioned at that seam. During step 106, a tungsten electrode traverses about the perimeter of each seam completing the weld. Several commercially available orbital welders are sufficient to perform the orbital welding process. Preferably, a microprocessor-controlled orbital welder having state of the art programming capability is used. Steps 105 and 106 are repeated for each seam in the assembled spool.

Next, at step 108, the inert gas purge is discontinued by, for instance, closing the valve of the gas supply. At step 110, the seals are removed. Thereafter, the spool comprising the welded tubing segments 92, 94 can be placed in storage until it is ready for installation in the process system.

Advantageously, utilizing an apparatus constructed in accordance with the principles of the present invention while performing the tack welding process yields several benefits. For instance, a single welder can perform the entire process and can do so with only a single inert gas purge. The gas purge is continuous for both the tack welding and orbital welding processes.

Applicant has disclosed only the preferred embodiment of the apparatus of the invention and the preferred embodiment of the method of the invention have been disclosed. Those skilled in the art, however, will appreciate and understand that the disclosed embodiments are merely representative examples of the principles of the present invention. Accordingly, the appended claims should be construed to cover all devices and processes embodying features that bring them within the true spirit and scope of the principles of the present invention, and those claims should not be limited by the disclosed embodiments.

I claim:

1. In combination, a pair of sanitary tubing segments and a clamp for aligning the segments, comprising:

a first thin walled stainless steel sanitary tubing segment having first and second ends;

a second thin walled stainless steel sanitary tubing segment having first and second ends, the first end of the first tubing segment and the first end of the second tubing segment having a common size and shape;

clamp holding the first end of the first tubing segment in direct contacting abutment with the first end of the second tubing segment to form a seam and to obtain and maintain precision alignment between the first ends of the first and second tubing segments without reforming either of said first ends, said clamp having a first clamp part and a second clamp part pivotally connected to the first clamp part, the first clamp part having first and second clamp portions thereof separated by a cutout included in the first clamp part, the cutout of the first clamp part being large enough and adapted to permit tack fusion welding at the seam, the first clamp portion of the first clamp part including a continuous inner surface contacting a first portion of said first tubing segment in close proximity to said first end thereof without reforming said first end thereof, and the second clamp portion of the first clamp part including a continuous inner surface contacting a first portion of said second tubing segment in close proximity to said first end thereof without reforming said first end thereof, the second clamp part having first and second clamp portions thereof separated by a cutout included in the second clamp part, the cutout of the second clamp part being large enough and adapted to permit tack fusion welding at the seam, the first clamp portion of the second clamp part including a continuous inner surface contacting a second portion of said first tubing segment in close proximity to said first end thereof without reforming said first end thereof, and the second clamp portion of the second clamp part including a continuous inner surface contacting a second portion of said second tubing segment in close proximity to said first end thereof without reforming said first end thereof; and a locking device operatively associated with said first and second clamp parts to hold said first and second clamp parts in position about said first ends of said first and second tubing segments, said locking device comprising:

a rod connecting the first and second clamp portions of the first clamp part;

a threaded shaft having a bore extending through it that accommodates and receives the rod to permit the shaft to be pivotally and slidably mounted on the rod;

a nut having a threaded inner surface threaded on the shaft and having a bore extending through it;

a bracket further connecting the first and second clamp portions of the second clamp part having a channel defined therein that is large enough to receive and accommodate the shaft, yet small enough so that it cannot receive and accommodate the nut; and an elongated pin extending through the bore of the nut to permit sliding movement therein.

2. In combination, a pair of sanitary tubing segments and a clamp for aligning the segments, comprising:

a first thin walled stainless steel sanitary tubing segment having first and second ends;

a second thin walled stainless steel sanitary tubing segment having first and second ends, the first end of the first tubing segment and the first end of the second tubing segment having a common size and shape;

a clamp holding the first end of the first tubing segment in direct contacting abutment with the first end of the second tubing segment to form a seam and to obtain and maintain precision alignment between the first ends of the first and second tubing segments without reforming either of said first ends, said clamp having a first clamp part and a second clamp part pivotally connected to the first clamp part, the first clamp part having first and second clamp portions thereof separated by a cutout included in the first clamp part, the cutout of the first clamp part being large enough and adapted to permit tack fusion welding at the seam, the first clamp portion of the first clamp part including a continuous inner surface contacting a first portion of said first tubing segment in close proximity to said first end thereof without reforming said first end thereof, and the second clamp portion of the first clamp part including a continuous inner surface contacting a first portion of said second tubing segment in close proximity to said first end thereof without reforming said first end thereof, the second clamp part having first and second clamp portions thereof separated by a cutout included in the second clamp part, the cutout of the second clamp part being large enough and adapted to permit tack fusion welding at the seam, the first clamp portion of the second clamp part including a continuous inner surface contacting a second portion of said first tubing segment in close proximity to said first end thereof without reforming said first end thereof, and the second clamp portion of the second clamp part including a continuous inner surface contacting a second portion of said second tubing segment in close proximity to said first end thereof without reforming said first end thereof; and a locking device operatively associated with said first and second clamp parts to hold said first and second clamp parts in position about said first ends of said first and second tubing segments, said locking device comprising:

a rod connecting the first and second clamp portions of the first clamp part, said rod being press-fitted into said first and second clamp portions of said first clamp part;

a threaded shaft having a bore extending through it that accommodates and receives the rod to permit the shaft to be pivotally and slidably mounted on the rod;

a nut having a threaded inner surface threaded on the shaft;

a bracket further connecting the first and second clamp portions of the second clamp part having a channel defined therein that is large enough to receive and accommodate the shaft, yet small enough so that it cannot receive and accommodate the nut.

3. The combination as defined by claim 1 wherein said pin includes a first end portion, a central portion adjacent to the first end portion of the pin, and a second end portion adjacent to the central portion and positioned opposite the first end portion of the pin, and wherein the bore of the nut has a predetermined bore size, said first end portion of said pin has a predetermined cross-section that is larger than said predetermined bore size, said central portion of said pin has a predetermined cross-section that is smaller than said predetermined bore size, and said second end portion of said pin has a predetermined cross-section that is larger than said predetermined bore size.

* * * * *